United States Patent [19]

Mittelstadt

[11] Patent Number: 4,726,924
[45] Date of Patent: Feb. 23, 1988

[54] METHOD OF PLANAR FORMING OF ZERO DEGREE COMPOSITE TAPE

[75] Inventor: Robert F. Mittelstadt, Auburn, Wash.

[73] Assignee: The Boeing Company, Seattle, Wash.

[21] Appl. No.: 851,223

[22] Filed: Apr. 14, 1986

Related U.S. Application Data

[62] Division of Ser. No. 626,414, Jun. 28, 1984, abandoned.

[51] Int. Cl.$^4$ ............ B27N 3/10; B29C 43/00; D04H 3/08; B65C 1/00
[52] U.S. Cl. ................ 264/257; 264/325; 156/180; 156/213
[58] Field of Search ............ 156/103, 164, 161, 181, 156/180, 200, 201, 290, 324, 433, 461, 463, 539, 544, 562, 581, 485, 212, 213; 100/211, 296; 264/136, 137, 325, 285, 257, 258

[56] References Cited

U.S. PATENT DOCUMENTS

| | | |
|---|---|---|
| 2,720,679 | 10/1955 | Ratliff . |
| 2,737,998 | 3/1956 | Mequor et al. . |
| 2,938,566 | 5/1960 | Toulmin, Jr. .................. 154/1.8 |
| 3,112,527 | 12/1963 | Paukratz et al. . |
| 3,122,789 | 3/1964 | Coffee ........................... 18/12 |
| 3,195,183 | 7/1965 | Phillips . |
| 3,207,827 | 9/1965 | Kuehnle . |
| 3,237,252 | 3/1966 | Ratcliffe . |
| 3,746,589 | 7/1973 | Reinke ........................ 156/581 |
| 3,850,568 | 11/1974 | Bartha et al. . |
| 3,905,290 | 9/1975 | Caughey ...................... 100/215 |
| 3,972,766 | 8/1976 | Foutrielle . |
| 3,989,581 | 11/1976 | Kober et al. . |
| 3,997,643 | 12/1976 | Munk et al. ................. 264/325 |
| 4,049,485 | 9/1977 | Iverson . |
| 4,094,897 | 6/1978 | Nagasawa et al. ........... 264/325 |
| 4,141,775 | 2/1979 | Williams et al. ............. 156/580 |
| 4,150,929 | 4/1979 | Brandt . |
| 4,357,292 | 11/1982 | Myers .......................... 156/181 |
| 4,445,957 | 5/1984 | Harvey ........................ 156/180 |

Primary Examiner—Donald E. Czaja
Assistant Examiner—L. Falasco
Attorney, Agent, or Firm—Joan H. Pauly

[57] ABSTRACT

A straight length of tape (100) is confined in a cavity having a thickness and width essentially the same as the thickness and width of the tape (100). The cavity is defined by upper and lower opposing sets of thin flexible strips (24). In each set, strips (24) are positioned with their faces abutting each other and their inner side edges confronting the inner side edges of the strips (24) in the other set to define the thickness of the cavity therebetween. A series of longitudinally spaced clamps (28) press the strips (24) against the tape (100) to exert on the tape (100) pressure of sufficient magnitude and uniformity to prevent buckling and wrinkling of the tape (100). With the tape confined, a series of longitudinally spaced drive units (50) bend the strips (24) and tape (100) into a desired planform configuration. The tape (100) is held confined in this planform configuration until the tape (100) stabilizes in its new configuration.

4 Claims, 18 Drawing Figures

METHOD OF PLANAR FORMING OF ZERO DEGREE COMPOSITE TAPE

This is a division, of application Ser. No. 626,414, filed June 28, 1984, abandoned.

DESCRIPTION

1. Technical Field

This invention relates to methods and apparatus for forming fiber reinforced composite material tape in the general plane of the tape and, more particularly, to such a method and apparatus in which the thickness of the tape is closely confined while the tape is being bent into a desired planform configuration, to prevent buckling and wrinkling of the tape.

2. Background Art

In the manufacture of aircraft, the use of composite materials, such as graphite fiber reinforced epoxy composites, is steadily increasing. The fabrication of graphite/epoxy aircraft parts usually begins with a roll of composite material tape having graphite fibers in a matrix of uncured epoxy resin. This tape is laid on a mandrel or other surface, and plies of the tape are built one upon another to obtain a desired thickness. It is relatively easy to lay the tape on a generally flat surface in a straight direction. However, it is relatively difficult to lay the tape on such a surface when it is desired to lay the tape in a curved direction in order to curve the tape in its plane. The difficulty in laying the tape in a curved direction is especially pronounced when the tape includes continuous zero degree graphite fibers; that is, fibers that run parallel to the longitudinal direction of the tape.

The need to lay tape curved in its plane arises frequently because many aircraft structural components are curved and it is generally desirable to maintain constant orientation of the fibers with respect to a reference line, such as a curved center line. For example, in most channel stringers the web is curved to mate with a curved surface, and the flanges are planar but curved in their planes to follow the curvature of the web. In order to meet the structural requirements for the stringer, each flange must include continuous zero degree fibers that are curved in the plane of the flange and follow the curvature of the web.

The difficulty in laying composite material tape in a curved planar configuration is due largely to the tendecy of the tape to buckle and/or wrinkle when laid in such a configuration. When the longitudinal axis of the tape is curved in the plane of the tape, the circumferential extent of the outer side edge of the curved portion of the tape is greater than the circumferential extent of the inner side edge of the curved portion of the tape. In other words, the radius of curvature increases and the curvature decreases from the inner side edge to the outer side edge of the tape. This difference in curvature could be accommodated by elongation of the fibers near the outer side edge and/or compression of the fibers near the inner side edge. However, graphite fibers are very rigid and are substantially incompressible, and such fibers typically exhibit only in the order of one and a half percent elongation at tensile failure. The difference in curvature might also be accommodated by slipping of the fibers with respect to each other. However, the epoxy resins used in the manufacture of aircraft components have a high viscosity and, thus, offer a considerable amount of resistance to slippage of the fibers. These characteristics of graphite fibers and epoxy resins result in buckling and/or wrinkling of the tape being the path of least resistance when graphite epoxy tape is laid in a planar curved configuration.

There are a number of known approaches to solving the buckling and wrinkling problem discussed above. One approach is to decrease the width of the tape in order to minimize the amount of buckling and wrinkling to an acceptable level. This approach has the disadvantages of being very labor intensive and time consuming. Another approach is to lay the plies of tape by hand and to use a heat gun to heat the tape as it is being laid to make the resin more fluid and thereby allow fiber slippage. After heating the tape, a worker obtains the desired slippage of fibers by working the buckling and wrinkles out of the tape with a hand spatula. Like the first approach, this approach has the disadvantages of being highly labor intensive and time consuming. In addition, the second approach is not adaptable to automation or mechanization. A third approach is to preply the tape by laying a multi-layer stack-up of tape in a straight direction and then mechanically hand working the stack-up to obtain the desired slippage of the fibers. This approach has the disadvantages of being labor intensive, requiring a high level of operator skill, and of not being readily subject to automation. The disadvantages of all three approaches greatly increase the cost of manufacture of the particular aircraft component.

U.S. Pat. No. 2,737,998, granted Mar. 13, 1956, to D. W. Meanor et al and U.S. Pat. No. 2,938,566, granted May 31, 1960, to H. A. Toulmin, Jr. each disclose a method for forming an elongated member from glass fibers in a resinous binder. Meanor et al disclose the manufacture of rods or tubes in which a glass fiber fabric impregnated with a resin is wrapped around a mandrel. The wrapped layers of fibrous material are cured by subjecting them to heat and pressure. In order to obtain uniform pressure during the curing process, a series of longitudinal pressure keys surround and are urged against the periphery of the wrapped mandrel. A molding process may be combined with the curing process. Toulmin, Jr. discloses the formation of structural beams from glass fiber reinforced resins. The process begins with the spraying of a fluid resin onto a mandrel to form a tube. As the resin is sprayed onto the mandrel, fibers are wound into the resin. The formed tube is flattened and shaped into the desired configuration by series of pairs of rollers.

U.S. Pat. No. 3,207,827, granted Sept. 21, 1965, to M. R. Kuehnle discloses a method of making a helical article. The article is "edge coiled"; that is, the larger dimension of the ribbon forming the helix is perpendicular to the helical axis. In this configuration, the circumferential length of the ribbon is greater at its outside edge than at its inside edge. The Kuehnle method for forming the edge coiled article includes the heating of a plastic material to a viscous state and then the extrusion of such material and the application of a pressure gradient to produce the desired configuration.

U.S. Pat. No. 2,720,679, granted Oct. 18, 1955, to V. C. Ratliff; U.S. Pat. No. 3,112,527, granted Dec. 3, 1963, to P. M. Pankratz et al; U.S. Pat. No. 3,122,789, granted Mar. 3, 1964, to R. D. Coffee; U.S. Pat. No. 3,195,183, granted July 20, 1965, to W. R. Phillips; U.S. Pat. No. 3,850,568 granted Nov. 26, 1974, to Z. Bartha et al; and U.S. Pat. No. 4,150,929, granted Apr. 24, 1979, to A. W. Brandt each disclose extrusion apparatus having an adjustable orifice. The devices disclosed in Ratliff U.S.

Pat. No. 2,720,679, Phillips U.S. Pat. No. 3,195,183, and Bartha et al U.S. Pat. No. 3,850,568 each include extrusion orifices partially defined by a plurality of aligned adjustable members. In each device, the members are individually adjustable in order to adjust the contour of the orifice.

U.S. Pat. No. 3,905,290, granted Sept. 16, 1975, to R. A. Caughey discloses a press for compacting and integrating material in products such as plywood, wood particle molding compound, and laminates. The press applies pressure to the substrate while the substrate is being moved through the press. The substrate is fed between two sets of aligned elongated bars. A ram acting on a platen above the upper set of bars presses the substrate between the bars to compact the material. The material is moved longitudinally through the press by a series of rams that are attached to and move the bars longitudinally. The friction of the bars against the substrate when the bars move simultaneously is sufficient to carry the substrate along with the bars. The bars are moved back to their initial position one at a time. The friction when one bar is moving is insufficient to cause the substrate to move with the bar, and thus, the substrate remains in an advanced position relative to the initial position of the bars.

U.S. Pat. No. 3,237,252, granted Mar. 1, 1966, to T. W. Ratcliffe discloses a mold clamping device. The device uses elongated inflated bladders to exert substantially uniform pressure on an elongated workpiece.

The known approaches to laying composite material tape in a curved planar configuration discussed above and the above patents and the prior art that is discussed and/or cited therein should be considered carefully for the purpose of putting the present invention into proper perspective relative to the prior art.

DISCLOSURE OF THE INVENTION

A subject of this invention is apparatus for forming fiber reinforced composite material tape in the general plane of the tape. According to an aspect of the invention, the apparatus includes restraint means for confining the tape to an elongated space during forming of the tape, to prevent buckling and wrinkling of the tape. The restraint means includes portions that define such space and that are flexible widthwise of the space. The space has along its length essentially the same thickness and width as the tape. Bending means are provided for exerting a force on such portions of the restraint means in a widthwise direction, to form the space and any tape confined therein into a predetermined platform configuration.

According to another aspect of the invention, such portions of the restraint means include first and second sets of thin flexible strips. The strips in each of the sets are positioned with their faces abutting each other and their inner side edges confronting the inner side edges of the strips in the other set to define the thickness of the space therebetween. Preferably, the restraint means further includes means for pressing the inner side edges of the strips against tape positioned therebetween, to cause such inner side edges to exert on the tape pressure of sufficient magnitude and uniformity to prevent buckling and wrinkling of the tape.

According to still another aspect of the invention, such portions of the restraint means include first and second opposing members. Each of these members includes a plurality of thin flexible strips positioned with their faces abutting each other and their inner side edges confronting the inner side edges of the strips in the other member to define the thickness of the space therebetween. The restraint means further includes means for pressing these members together, to cause the inner side edges of the strips to exert on tape positioned therebetween pressure of sufficient magnitude and uniformity to prevent buckling and wrinkling of the tape.

According to still another aspect of the invention, the bending means comprises a plurality of linear drive units, and configuration defining means for defining said predetermined platform configuration. The drive units engage the restraint means at longitudinally spaced intervals. Preferably, each drive unit has a movable portion that is attached to the restraint means, and the configuration defining means includes means for independently controlling widthwise movement of each such movable portion. In embodiments in which the restraint means includes first and second opposing members and means for pressing such members together, such means for pressing preferably comprises a plurality of clamping devices which clamp said members together at longitudinally spaced intervals and each of which is attached to the movable portion of a different one of the drive units.

Another subject of the invention is apparatus for changing the platform of a length of composite material tape having reinforcing fibers in a resin matrix. According to an aspect of the invention, the apparatus comprises cavity defining means and means for applying a bending force. The cavity defining means defines a cavity having along its length essentially the same thickness and width as the tape. The cavity defining means is bendable widthwise of the cavity without changing the width and thickness of the cavity. The means for applying a bending force applies such force to the cavity defining means widthwise of the cavity. The force changes the planform of the cavity and any tape within the cavity, without buckling or wrinkling of the tape. Preferably, the cavity defining means includes first and second sets of thin flexible strips positioned as described above. Also preferably, the means for applying a bending force comprises a plurality of linear drive units that engage the cavity defining means at longitudinally spaced intervals.

Still another subject of the invention is a method of forming fiber reinforced composite material tape in the general plane of the tape. According to an aspect of the invention, the method comprises confining the tape to an elongated space having essentially the same thickness and width as the tape. The space and the tape are bent in a widthwise direction, to form the space and tape into a predetermined planform configuration. While the space and tape are being so bent, the confinement of the tape to said space is continued to prevent buckling and wrinkling of the tape. Preferably, the method further comprises holding the tape in such configuration for a period of time sufficient to allow the tape to stabilize in the configuration. Also preferably, the step of bending comprises applying a plurality of bending forces at intervals spaced along the tape, and independently controlling each such bending force to define the configuration.

The method and apparatus of the invention solve the problem of buckling and wrinkling discussed above and, at the same time, avoid the disadvantages of known means for forming composite material tape into a curved planar configuration. The method and apparatus of the invention require relatively little labor and relatively little operator skill and are readily adaptable to automation. The method of the invention can be carried out relatively quickly, and the apparatus of the invention is not complicated. Therefore, the method and apparatus of the invention provide means for quickly, easily, and inexpensively forming composite material tape into a curved planar configuration. The result is a relatively inexpensive and high quality aircraft component.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
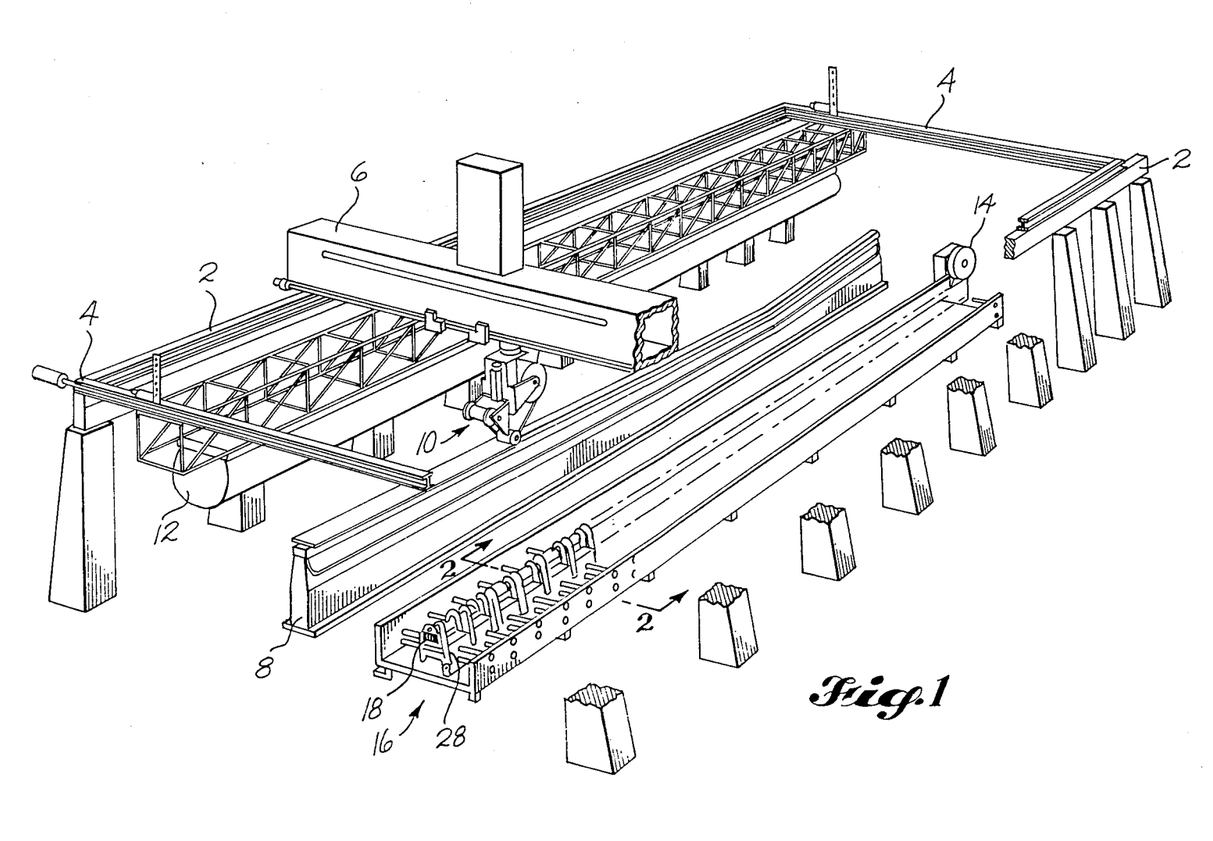
FIG. 1 is a pictorial view of the preferred embodiment of the apparatus of the invention shown incorporated in an installation for manufacturing channel stringers.
Figure 12:
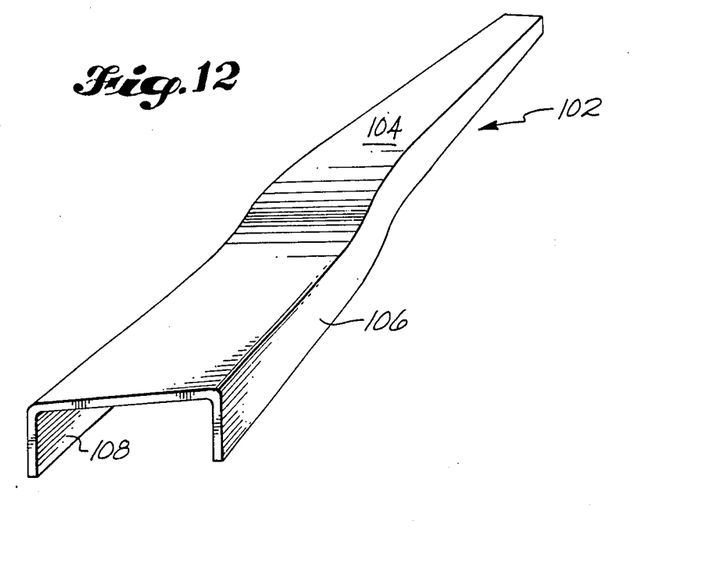
FIG. 12 is a pictorial view of a channel stringer having flanges which have curved planar configurations and which include preplied tape formed in accordance with the invention.
Figure 13:
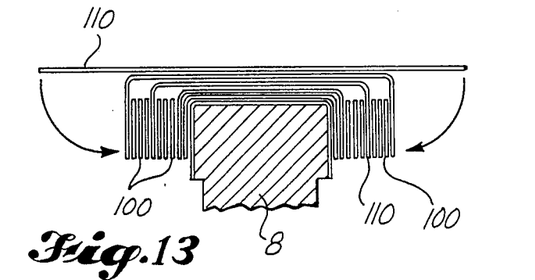
FIG. 13 is a partially schematic sectional view of the channel stringer shown in FIG. 12 being formed on a mandrel.

The drawings show apparatus 16 that is constructed according to the invention and that also constitutes the best mode of the apparatus of the invention currently known to the applicant. The drawings also illustrate the best mode for carrying out the method of the invention currently known to the applicant. FIG. 1 shows the apparatus 16 incorporated into an installation for manufacturing channel stringers. FIG. 12 illustrates a finished channel stringer 102. FIG. 13 illustrates the channel stringer 102 shown in FIG. 12 during the manufacturing process. The manufacturing installation shown in FIG. 1 and the channel stringer 102 shown in FIG. 12 are shown and described herein for the purpose of illustrating a typical use environment for the method and apparatus of the invention and a typical aircraft component into which tape formed in accordance with the invention may be advantageously incorporated. It is of course to be understood that the method and apparatus of the invention may be used to advantage in other installations and in the manufacture of other articles that require the incorporation of composite material tape that has been formed in the general plane of the tape.

Referring to FIGS. 1 and 13, the channel stringer 102 is formed on a mandrel 8. The mandrel 8 is surrounded by a support structure that includes two side rails 2 and two end rails 4. A gantry 6 moves along and between the two side rails 2. A tape laying head 10 is carried by the gantry 6. The tape laying head 10 lays wide plies 110 of tape onto the top surface of the mandrel 8, which corresponds to the web 104 of the channel stringer 102. The side edge portions of the tape 110 laid by the head 10 are formed down over the mandrel 8 by an inflatable bag 12 that extends between the end rails 4 and is carried by the gantry 6. The forming of the plies of wide tape 110 is the subject of a copending application of the present applicant and George R. Stumpf, Jr., assigned Ser. No. 565,187, now U.S. Pat. No. 4,475,976 and which is entitled "Method And Apparatus For Forming Composite Material Articles". The forming of the plies 110 is in no way a part of the present invention and will not be discussed herein in any detail. The method and apparatus of the invention of said copending application are illustrated and briefly described herein solely for the purpose of illustrating what is expected to be a principle use environment for the method and apparatus of the present invention.

Figure 2:
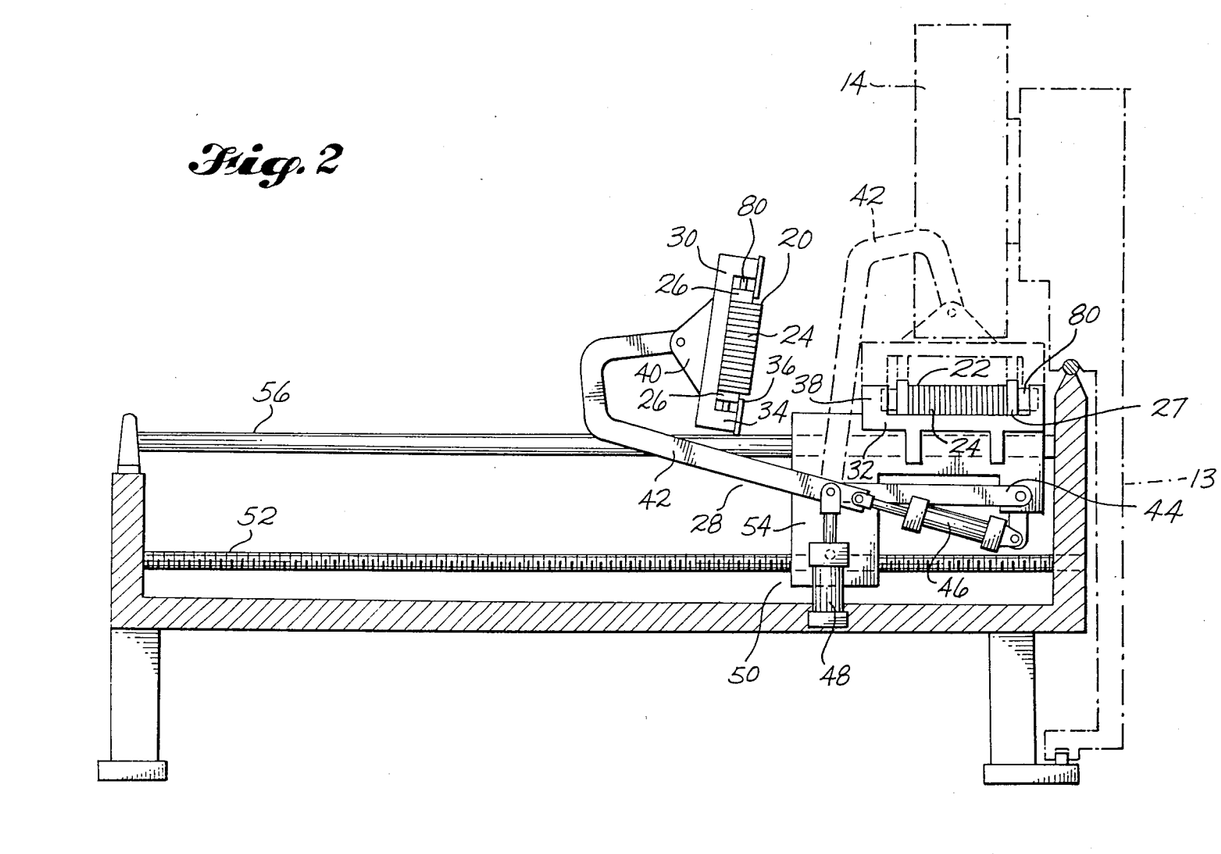
FIG. 2 is a sectional view taken along line 2—2 in FIG. 1.

Still referring to FIGS. 1 and 13, the tape 100 that is to be formed in accordance with the present invention is preplied on flat preply tool 15. The tape 100 is laid onto member 15 in a straight flat configuration. When a stack-up with the desired number of plies has been laid onto tool 15, the stack-up is slit to the desired width and spooled onto a core to provide a spool of preplied tape to be laid onto the forming tool 18 of the invention. The spool of preplied tape is placed onto side ply dispensing head 14. The side ply dispensing head 14 is mounted on a slide 13 which is in turn mounted on the frame of the apparatus 16 of the invention. (see FIG. 2) The preplied tape 100 is deposited onto the bottom member 22 of the tool 18 from head 14 in a straight flat configuration.

The preplied tape 100 is placed into the apparatus 16 of the invention for forming the tape 100 in the general plane of the tape 100 to change its planform. In the apparatus 16 of the invention, the tape 100 is bent into the desired planform configuration while it is being restrained from buckling and/or wrinkling by confining it to an elongated space. The means for restraining the tape 100 includes portions of the apparatus that define this space. The space is dimensioned to have essentially the same thickness and width as the tape 100 so that it will coincide with the plane of the tape 100 during the bending operation and prevent distortion of the tape 100. In other words, the method and apparatus of the invention forms the tape 100 within its plane but confines the tape 100 to its plane and its original thickness and width so that it is still flat but no longer straight upon completion of the forming operation.

The apparatus 16 of the invention includes a forming tool 18 that defines the elongated space or cavity to which the tape 100 is to be confined. The tool 18 has a top member 20 and an opposing bottom member 22. Each of these members 20, 22 includes a plurality of longitudinally extending thin flexible strips 24 and two longitudinally extending flexible outer face members 26, 27. Each of the strips 24 and face members 26, 27 runs the full length of the tool 18, which is dimensioned to be at least as long as the length of tape to be formed. The set of strips 24 in each member 20, 22 is arranged with the faces (major surfaces) of the strips 24 abutting each other and the inner side edges of the strips 24 confronting the inner side edges of the strips 24 in the other member 20, 22. The thickness of the elongated space or cavity is defined between the inner side edges of the strips 24 in the top member 20 and the inner side edges of the strips 24 in the bottom member 22. When the inner side edges of the strips 24 are pressed against the tape 100, the thickness of the space is controlled primarily, if not entirely, by the thickness of the tape 100.

The outer face members 26, 27 of each member 20, 22 are positioned parallel to the strips 24 and abut the outer vertical faces of the set of strips 24. Members 26, 27 facilitate the fastening together of strips 24 in a crosswise (widthwise) direction and also help to prevent the inner side edges of adjacent strips 24 from separating. Separation of these edges is undesirable because it would reduce the uniformity of the pressure exerted on tape 100 by strips 24 and because it could result in resin from the tape matrix being squeezed into the space between said edges.

The strips 24 and face members 26, 27 are flexible widthwise of the space and the tape 100 confined therein and may be bent widthwise of the space without changing the width and thickness of the space. As noted above, the space to which the tape 100 is confined has essentially the same width as the tape 100. Therefore, the width of the sets of strips 24 is preferably essentially equal to the width of the tape 100. The sets of strips 24 may also be wider than the tape 100 and the space to which it is confined. The pressure of the inner side edges of the strips 24 on the tape 100 prevents widthwise slippage of the tape 100 within the tool 18 during the bending operation.

The strips 24 are preferably made from a plastic material, such as ultra high molecular weight polyethylene, that will not stick to the uncured tape 100 and that will slide with respect to itself and the tape 100. The side members 26, 27 are also preferably made from a material such as ultra high molecular weight polyethylene.

Figure 5:
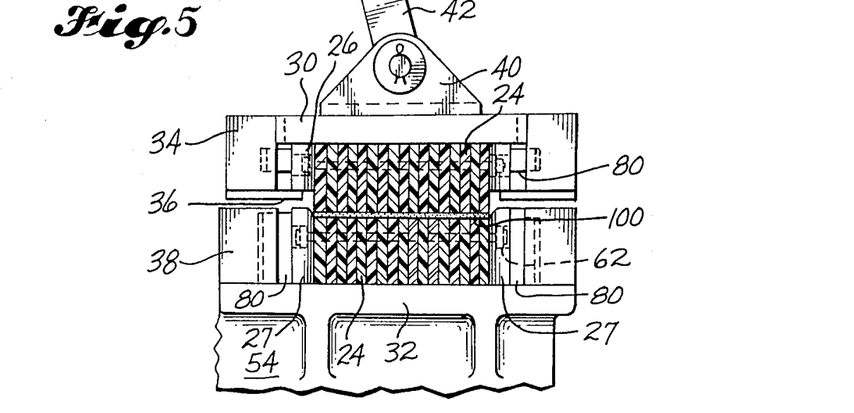
FIG. 5 is an enlarged view of a portion of FIG. 3.
Figure 6:
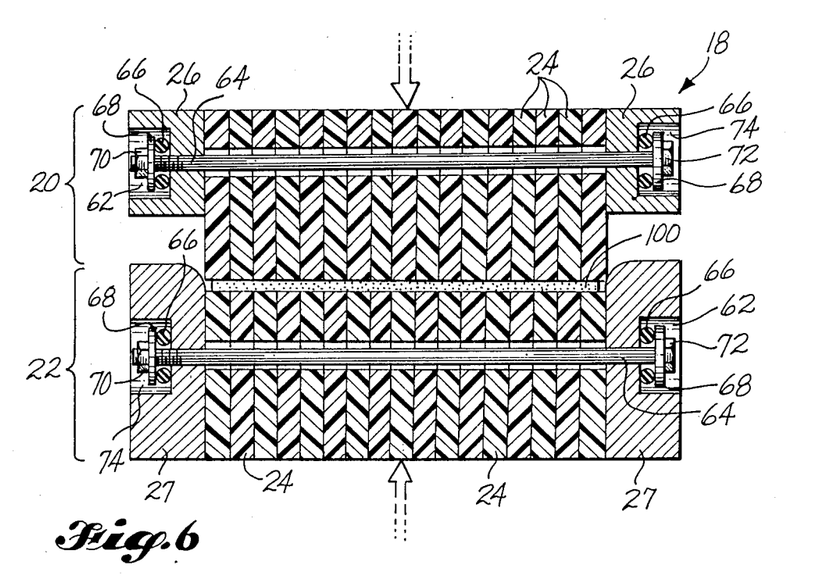
FIG. 6 is a sectional view of the opposing top and bottom members of the forming tool of the preferred embodiment.

The strips 24 and face members 26, 27 of each of the top and bottom members 20, 22 are secured together by means of a series of crosswise fasteners 62. (See FIGS. 5 and 6.) These fasteners 62 are spaced longitudinally along each member 20, 22 at about four inch intervals. Each fastener 62 includes a bolt 64 that extends through aligned widthwise holes in the strips 24 and face members 26, 27. The holes in the strips 24 provide clearance for the bolt 62 to accommodate widthwise bending of the strips 24 and longitudinal slippage of the strips 24 with respect to each other. For example, in the preferred embodiment one quarter inch diameter bolts 62 are used and the holes in the strips 24 have a five sixteenths inch diameter. A washer 68 and elastic disk or O-ring 66 are received onto each end of the bolt 62. During the bending operation, the elasticity of the O-rings 66 accommodates changes in required fastener length resulting from varying angular orientations of the fasteners. A nut 70 is received onto the end of the bolt 62 opposite the bolt head 72. At each end of the fastener 62, the O-ring 66, washer 68, and bolt head 72 or nut 70 are received into a recess 74 in the face member 26, 27 so that the fastener 62 does not protrude from the tool 18.

The restraint means preferably also includes means for pressing the inner side edges of the strips 24 of members 20, 22 against the tape 100 positioned therebetween. This pressing means causes the inner side edges of the strips 24 of members 20, 22 to exert on the tape 100 pressure of sufficient magnitude and uniformity to prevent buckling and wrinkling of the tape 100 during the forming of the tape 100 in its plane. In the preferred embodiment shown in the drawings, the means for pressing the inner side edges against the tape 100 comprises a series of clamps 28 that press the top and bottom members 20, 22 together at longitudinally spaced intervals. As is most clearly shown in FIG. 4, there is only a small gap, in the order of one-half inch, between the clamping devices 28 to insure that the pressure on the tape 100 will be sufficiently uniform to prevent buckling and wrinkling of the tape 100.

In addition to the restraint means for confining the tape 100, the apparatus 16 of the invention also includes bending means for exerting a force on the forming tool 18 in a widthwise direction, to form the cavity defined by the tool 18 and the tape 100 confined in the cavity into a predetermined platform configuration. In the use environment illustrated in the drawings, this platform configuration is determined by the desired configuration of the flanges 106, 108 of the channel stringer 102. The bending means preferably comprises a plurality of linear drive units 50 that engage the forming tool 18 at longitudinally spaced intervals. In the preferred embodiment shown in the drawings, there is one drive unit 50 corresponding to each clamp device 28. The drive unit 50 includes a movable portion or carriage 54 on which the corresponding clamp 28 is mounted and to which the forming tool 18 is attached. In this preferred arrangement, the clamp 28 moves with the carriage 54 and forming tool 18 in a widthwise direction as the tape 100 is being formed.

Figure 3:
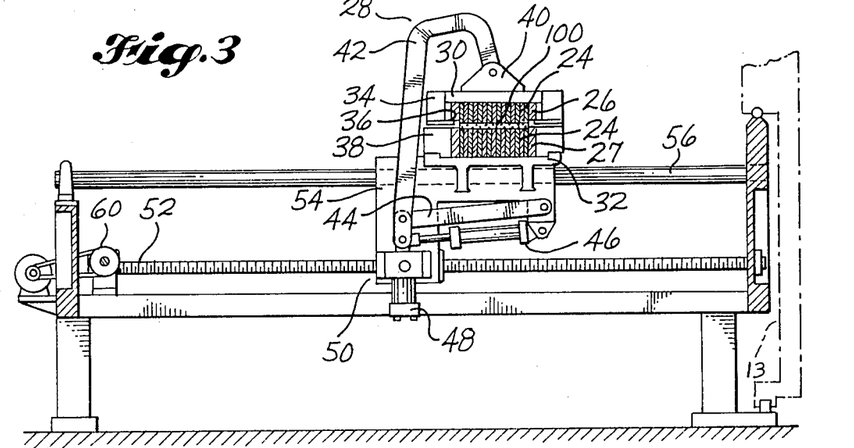
FIG. 3 is a sectional view taken along line 3—3 in FIG. 4.

Each drive unit 50 of the preferred embodiment shown in the drawings includes a screw drive shaft 52 that is rotated by a motor 60. External threads on the shaft 52 engage internal threads in an opening through the carriage 54 for receiving the shaft 52. When the shaft 52 is rotated by the motor 60, the carriage 54 is moved translationally in a widthwise direction in a known manner. The drive unit 50 also includes an upper guide bar 56 for guiding the widthwise movement of the carriage 54. A lower end portion of the carriage 54 engages the threaded shaft 52, and an upper portion of the carriage 54 engages the guide bar 56, as is most clearly shown in FIGS. 2 and 3.

Referring to FIGS. 2-5, the restraint means of the apparatus 16 of the preferred embodiment includes a top platen 30 and a bottom platen 32 corresponding to each clamp 28. The platens 30, 32 are made from a strong rigid material. Each top platen 30 is positioned over the upper surface of top member 20 and abuts the outer side edges of flexible strips 24 and face members 26 of member 20. Each bottom platen 32 is positioned under the lower surface of bottom member 22 and abuts the outer side edges of flexible strips 24 and face members 27 of member 22. Forming tool 18 is mounted onto the carriages 54 by means of an attachment of each bottom platen 32 to the top of the corresponding carriage 54.

Each bottom platen 32 has two opposite vertical projections 38 extending upwardly therefrom parallel to and spaced from the outer vertical faces of flexible face members 27 of bottom member 22. Each top platen 30 has two vertical projections 34 extending downwardly therefrom parallel to and spaced from the outer vertical faces of flexible face members 26 of top member 20. Each top projection 34 includes a retainer plate 36 that extends inwardly in a widthwise direction and engages the bottom surface of the corresponding flexible face member 26 of the top member 20 of the forming tool 18. The plates 36 serve to hold the top member 20 of the forming tool 18 in position with respect to platen 30.

The tool 18 is held in a center position between the projections 34, 38 by pairs of rounded guide blocks 80. A guide block 80 projects widthwise inwardly from each projection 34, 38 and contacts the corresponding face member 26, 27. One block 80 of each pair is fixed, and the other is spring loaded to compensate for minor variations in the width of the tool member 18. The spacing of the tool 18 from projections 34, 38 by guide blocks 80 provides clearance to permit bending of tool 18 in a widthwise direction.

Each clamp 28 includes a bifurcated head portion 40 that is attached to and transmits a pressing force to the corresponding top platen 30. Since bottom platen 32 is attached to carriage 54 and is supported in its vertical position by guide bar 56, the exertion of pressure on top platen 30 causes the inner side edges of strips 24 to exert pressure on the tape 100 confined in the cavity defined by the strips 24. The head portion 40 of the clamp 28 is pivotably attached to a bent pivot arm 42 that generally has the shape of an upside down "J". The lower end of arm 42 is mechanically linked to linear actuators 46, 48. Linear actuator 48 is connected to stabilizer arm 44 and moves pivot arm 42 in a downward vertical direction to clamp members 20, 22 together. Actuator 48 may be operated in the opposite direction to release the clamping pressure on top platen 30. Then the actuator 46 may be operated to pivot the J-shaped arm 42, along with top member 20, away from bottom member 22 to permit the removal of the formed tape 100.

In the use environment illustrated in the drawings, the method of the invention is preferably carried out as follows.

Figures 7A, 7B, 8A, 8B, 9A, 9B:
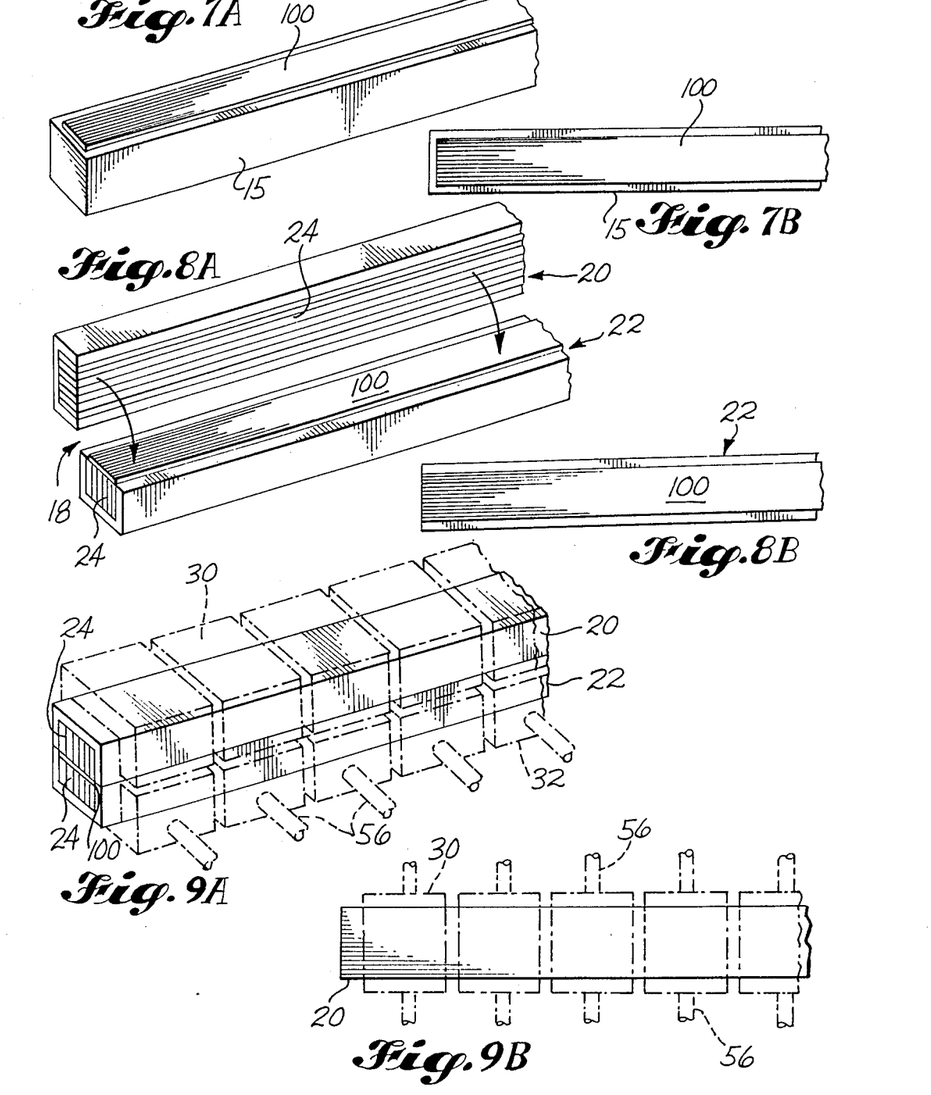
FIG. 7A is a schematic pictorial view of a portion of the preply tool on which the tape is laid and preplied before being laid onto the apparatus of the invention.
FIG. 7B is a top plan view of the preply tool shown in FIG. 7A.
FIG. 8A is a partially schematic pictorial view of end portions of the top and bottom members of the preferred embodiment of the apparatus of the invention, showing the top member pivoted upwardly away from the bottom member and the tape positioned on the bottom member.
FIG. 8B is a top plan view of the bottom member shown in FIG. 8A.
FIG. 9A is a pictorial view of an end portion of the preferred embodiment of the apparatus of the invention, showing the apparatus and the tape positioned therein ready for the commencement of the bending process.
FIG. 9B is a top plan view of the apparatus shown in FIG. 9A.

First the preply stack-up of tape to be formed in the apparatus 16 of the invention is laid onto preply forming tool 15. Plies of tape 100 are laid onto tool 15 until the desired number of plies have been built up. (See FIGS. 7A and 7B.) An example of a stack-up suitable for use in the manufacture of a channel stringer such as that shown in FIG. 12 is a three-ply stack-up of two plies of zero degree tape and one ply of zero degree-ninety degree fabric tape. After the desired number of plies of tape have been laid one upon another on the preply forming tool 15, the preplied tape 100 is spooled and mounted on tape dispensing head 14, as described above. At this point in the operation, clamp arms 42 have been pivoted to pivot top member 20 upwardly and to the side of bottom member 22 to permit the positioning of tape 100 on forming tool 18, and all of the carriages 54 of the drive units 50 are in the home position shown in FIG. 2 so that the forming tool 18 is in straight position. The tape 100 is deposited directly onto bottom member 22 from tape head 14. (See FIG. 2.) The positioning of the tape 100 on bottom member 22 is illustrated in FIGS. 8A and 8B. When the tape 100 has been positioned in the forming tool 18, clamp arms 42 are pivoted by operating actuators 46 to bring top member 20 in position over bottom member 22. Then, actuators 48 are operated to clamp members 20, 22 together and confine the tape 100 under pressure in the longitudinal space or cavity formed by flexible strips 24. FIGS. 9A and 9B illustrate the apparatus of the invention at this point in the operation.

Figure 4:
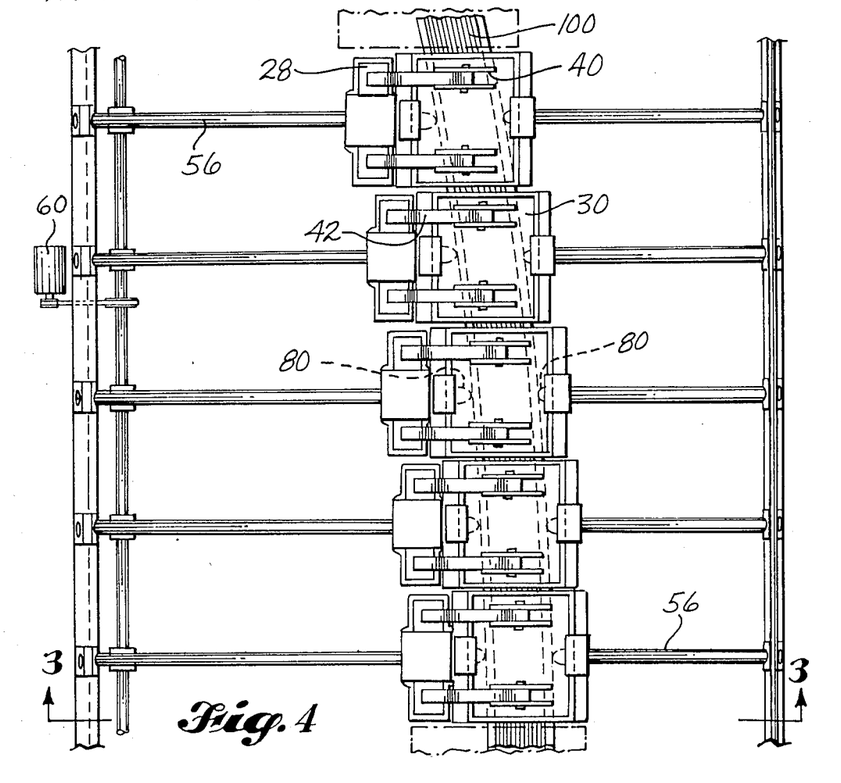
FIG. 4 is a top plan view of a portion of the preferred embodiment of the apparatus of the invention shown in FIG. 1, illustrating in somewhat exaggerated form the positions of the clamping devices and carriages of the drive units following bending of the tape into the desired configuration.

Once the tape 100 has been confined, the bending operation may begin. The motor 60 is activated, and clutch mechanisms between motor 60 and each of the drive units 50 are operated to move the carriage 54 of each particular unit 50 to a predetermined widthwise position. The positioning of each carriage 54 is determined by the desired curved planform configuration of the tape 100 after the forming process. Each drive unit 50 is controlled independently to permit each carriage 54 to be independently positioned. The independent positioning of the carriages 54 defines the final configuration of the tape 100 and is preferably regulated by means of a computer. Various computerized numerical control methods that are known in the art may be used in the positioning of the carriage 54. The configuration of the forming tool 18 near the end of the bending process is illustrated in exaggerated form in FIGS. 10A and 10B. FIG. 4 shows, also in exaggerated form, the positions of the carriages 54 of the drive units 50 at the end of the bending operation.

While the drive units 50 are being operated to move the carriages 54 and to bend the forming tool 18 and the tape 100, the confinement of the tape 100 to the elongated space defined by the flexible strips 24 is of course continued to prevent buckling and wrinkling of the tape 100. The clamps 28 mounted on the carriages 54 move with the tool 18 and tape 100 and continue to cause the strips 24 to exert pressure on the tape 100. Since the tape 100 is confined under pressure in the space defined by the strips 24, there is no physical space in which the tape 100 could buckle or wrinkle. Therefore, there is essentially no buckling or wrinkling of the tape 100 and only minimal, if any, distortion of the fibers in the tape 100.

It appears that the method and apparatus of the invention successfully prevent buckling and wrinkling of the tape 100 because the confinement of the tape 100 results in the path of least resistance being the longitudinal slippage of the zero degree fibers in the tape 100 with respect to each other and the slippage of the fibers with other orientations. With the tape being restrained from buckling or wrinkling, the viscosity of the resin in the tape is overcome and the zero degree and other fibers slip with respect to each other to compensate for changes in curvature of the fibers along the widthwise direction. The opposing sets of flexible strips 24 of the preferred embodiment are particularly effective in maintaining a uniform pressure on the tape 100 during the forming process apparently because such strips 24 act in the same manner as the zero degree fibers of the tape 100 and slip longitudinally with respect to each other.

Once the tape 100 has been bent into the desired configuration, it is desirable to stabilize the tape 100 in the new configuration. The stabilization of the tape 100 is preferably carried out simply by holding the tape 100 in the new configuration for a period of time sufficient to allow the tape 100 and the resin matrix therein to stabilize. For a graphite/epoxy tape, the period of time sufficient for stabilization is typically five to ten minutes.

Figures 10A, 10B, 11A, 11B:
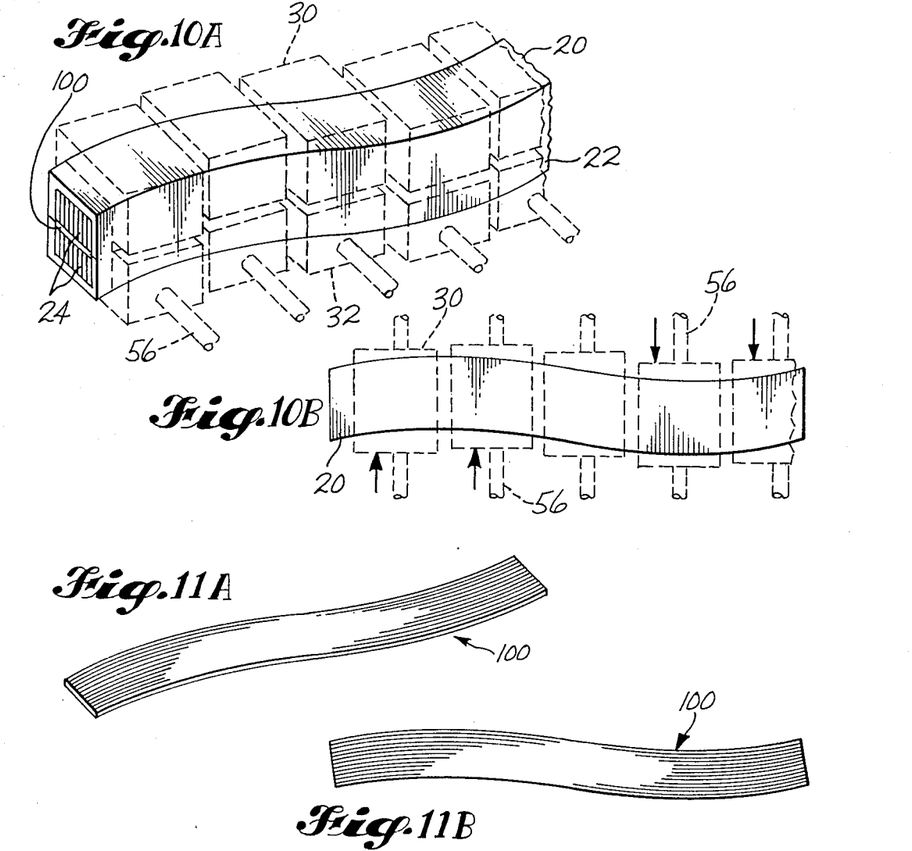
FIG. 10A is a pictorial view of the apparatus shown in FIG. 9A, illustrating the configuration of the apparatus near the end of the bending process.
FIG. 10B is a top plan view of the apparatus shown in FIG. 10A.
FIG. 11A is a pictorial view of the tape after it has been formed into its desired curved planar configuration and has been removed from the apparatus of the invention.
FIG. 11B is a top plan view of the tape shown in FIG. 11A.

When the tape has stabilized in its new configuration, the actuators 46, 48 are operated to release the clamps 28 and to pivot the top member 20 upwardly and away from the bottom member 22 to allow removal of the formed tape 100. FIGS. 11A and 11B illustrate the appearance of the tape 100 following its removal from the forming tool 18. After removing the tape 100 from the tool 18, the operator places the tape 100 onto a side surface of the mandrel 8 for incorporation into one of the flanges 106, 108 of the channel stringer 102. The poositioning of a number of stack-ups 100 of tape formed in accordance with the present invention is illustrated in FIG. 13. The forming and compaction of the wider plies of tape 110 is the subject of the above-cited copending application and will not be described any further herein.

The preferred embodiment of the method and apparatus of the present invention have been described herein in connection with forming zero degree and zero-ninety degree graphite/epoxy tape. It is intended to be undrstood that the invention can also be used to advantage in the forming of other types of composite material tape that have a tendency to buckle and/or wrinkle when subjected to widthwise forces. The term "composite material tape", as used herein, includes composite materials having fibers with multiple orientations and such materials having woven or knitted fibers, as well as composite material tape having fibers with a single orientation. The term also includes both single plies of tape and multi-ply stack-ups. The width of the tape is preferably constant, but may be variable (e.g. the tape may have a wedge-shaped planform). The thickness of the tape may also vary somewhat; for example due to ply drops offs in a stack-up in which some plies are shorter than others.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. A method of forming fiber reinforced composite material tape in the general plane of the tape, comprising:

exerting pressure on the tape in a thicknesswise direction perpendicular to said plane to confine the tape to an elongated space having essentially the same thickness and width as the tape;

bending said space and the tape confined therein by said pressure in a widthwise direction perpendicular to said thicknesswise direction, to form said space and tape into a predetermined planform configuration; and while so bending said space and tape, continuing to confine the tape to said space to prevent buckling and wrinkling of the tape.

2. A method as described in claim 1, further comprising after bending said space and tape, maintaining said space in said configuration and continuing to confine said tape to said space for a period of time sufficient to allow said tape to stabilize in said configuration.

3. A method as described in claim 1, in which the step of bending comprises applying a plurality of bending forces at intervals spaced along the tape, and independently controlling each such bending force to define said configuration.

4. A method as described in claim 1, in which the step of exerting pressure comprises operating a plurality of clamping devices spaced longitudinally along the tape, and the step of bending comprises moving said devices in said widthwise direction and independently controlling the movement of each device to define said configuration.

* * * * *

UNITED STATES PATENT AND TRADEMARK OFFICE
CERTIFICATE OF CORRECTION

PATENT NO. : 4,726,924

DATED : February 23, 1988

INVENTOR(S) : Robert F. Mittelstadt

It is certified that error appears in the above-identified patent and that said Letters Patent is hereby corrected as shown below:

```
Column 1, line 49,  "tendecy"     should be  -- tendency --.
Column 2, line 48, after "by",  -- a -- should be inserted.
Column 3, line 50,  "platform"    should be  -- planform --.
Column 4, line 11,  "platform"    should be  -- planform --.
Column 4, line 26,  "platform"    should be  -- planform --.
Column 8, line 47,  "platform"    should be  -- planform --.
Column 8, line 48,  "platform"    should be  -- planform --.
Column 10, line 43, "carriage"    should be  -- carriages --.
Column 11, line 31, "poositioning" should be  --
    positioning --.
Column 11, line 41, "undrstood"   should be  -- understood --.
Column 12, line 5,  "drops"       should be  -- drop --.
```

Signed and Sealed this

Tenth Day of January, 1989

Attest:

DONALD J. QUIGG

*Attesting Officer*           *Commissioner of Patents and Trademarks*